US011410006B2

(12) United States Patent
Yamaya (10) Patent No.: US 11,410,006 B2
(45) Date of Patent: Aug. 9, 2022

(54) IMAGE FORMING APPARATUS, CONTROL METHOD, AND CONTROL PROGRAM INCLUDING CALCULATION OF CHROMATICITY (71) Applicant: Konica Minolta, Inc., Tokyo (JP)

(72) Inventor: Yorihiro Yamaya, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/227,665

(22) Filed: Apr. 12, 2021

(65) Prior Publication Data
US 2021/0319275 A1 Oct. 14, 2021

(30) Foreign Application Priority Data

Apr. 14, 2020 (JP) .............................. JP2020-072163

(51) Int. Cl.
*G06K 15/00* (2006.01)
*G06K 15/10* (2006.01)
(52) U.S. Cl.
CPC ......... *G06K 15/407* (2013.01); *G06K 15/102* (2013.01); *G06K 15/4065* (2013.01)
(58) Field of Classification Search
CPC ............... G06K 15/407; G06K 15/102; G06K 15/4065; B41J 2/2117; B41J 2/2135; B41J 2/2142; B41J 2/2146; B41J 2/2114; H04N 1/506; H04N 1/60
See application file for complete search history.

(56) References Cited

U.S. PATENT DOCUMENTS

| 2010/0060682 | A1  | 3/2010 | Akatsuka |
| 2010/0214340 | A1  | 8/2010 | Sugahara et al. |
| 2011/0058195 | A1* | 3/2011 | Kano ....................... H04N 1/46 358/1.9 |
| 2013/0222467 | A1* | 8/2013 | Ooishi ................... B41J 2/2114 347/21 |
| 2017/0165873 | A1* | 6/2017 | Regelman ............... G01J 3/524 |

FOREIGN PATENT DOCUMENTS

| EP | 2514595 A1 | 10/2012 |
| JP | 2010194839 A | 9/2010 |

OTHER PUBLICATIONS

EPO Extended European Search Report for corresponding EP Application No. 21167022.9; dated Sep. 6, 2021.

* cited by examiner

*Primary Examiner* — Iriana Cruz
(74) *Attorney, Agent, or Firm* — Cantor Colburn LLP (57) ABSTRACT

There is provided an image forming apparatus that forms an image with a plurality of coloring materials on a recording medium, and the image forming apparatus includes: a hardware processor that calculates a chromaticity range having a color difference not less than a setting value to respective chromaticities of the plurality of coloring materials for use in formation of the image, as a base color range common between the plurality of coloring materials.

11 Claims, 5 Drawing Sheets

IMAGE FORMING APPARATUS, CONTROL METHOD, AND CONTROL PROGRAM INCLUDING CALCULATION OF CHROMATICITY

CROSS REFERENCE TO RELATED APPLICATIONS

This present invention claims priority under 35 U.S.C. § 119 to Japanese Patent Application No. 2020-072163, filed on Apr. 14, 2020, the entire content of which is incorporated herein by reference.

BACKGROUND

Technological Field

The present invention relates to an image forming apparatus, a control method in the image forming apparatus, and a control program in the image forming apparatus.

Description of the Related Art

Examples of a technique for inspecting an image forming apparatus includes a technique disclosed in JP 2010-194839 A. There is described in JP 2010-194839 A, in the case of performing determination whether or not, among a plurality of types of nozzles, an abnormality in ink ejection occurs in a nozzle included in a first nozzle group for ejecting a first color ink having the smallest color difference to the recording medium, the determination-pattern printing controller causes a nozzle included in a second nozzle group for ejecting a second color ink different from the first color ink to eject the second color ink on the recording medium and then causes the nozzle included in the first nozzle group to eject the first color ink to an area on which droplets of the second color ink are landed in the recording medium such that a first determination pattern is printed, the first determination pattern indicating, on the area, whether or not the abnormality in ink ejection occurs in the nozzle included in the first nozzle group.

Meanwhile, in an image forming apparatus with coloring materials such as ink and toner, prior to image formation, performed is image adjustment with an adjustment chart, such as alignment of formation position between the respective coloring materials of the colors and color unevenness. Some of adjustment charts include the respective coloring materials of the colors simultaneously disposed side by side. In this case, in the above technique, an improvement is made in the visual recognition of an ink as a first coloring material formed on another ink as a second coloring material, whereas an improvement is not always made in the visual recognition of a different color ink formed on the second color ink. Thus, it is not always that the respective coloring materials of the colors can be detected simultaneously and easily.

SUMMARY

Therefore, an object of the present invention is to provide an image forming apparatus capable of image adjustment due to certain simultaneous and easy detection of a plurality of coloring materials, in image adjustment with an adjustment chart with the plurality of coloring materials; a control method in the image forming apparatus; and a control program in the image forming apparatus.

To achieve the abovementioned object, according to an aspect of the present invention, there is provided an image forming apparatus that forms an image with a plurality of coloring materials on a recording medium, and the image forming apparatus reflecting one aspect of the present invention comprises: a hardware processor that calculates a chromaticity range having a color difference not less than a setting value to respective chromaticities of the plurality of coloring materials for use in formation of the image, as a base color range common between the plurality of coloring materials.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of an image forming apparatus, a control method in the image forming apparatus, and a control program in the image forming apparatus, to which the present invention is applied will be described with reference to the drawings. However, the scope of the invention is not limited to the disclosed embodiments. Note that in the embodiment described below, description will be made with an exemplary inkjet image forming apparatus that uses each color ink as a coloring material. The present invention, however, is not limited to the example, and thus is applicable to an electrophotographic image forming apparatus that uses each color toner.

<<Image Forming Apparatus>>

Figure 1:
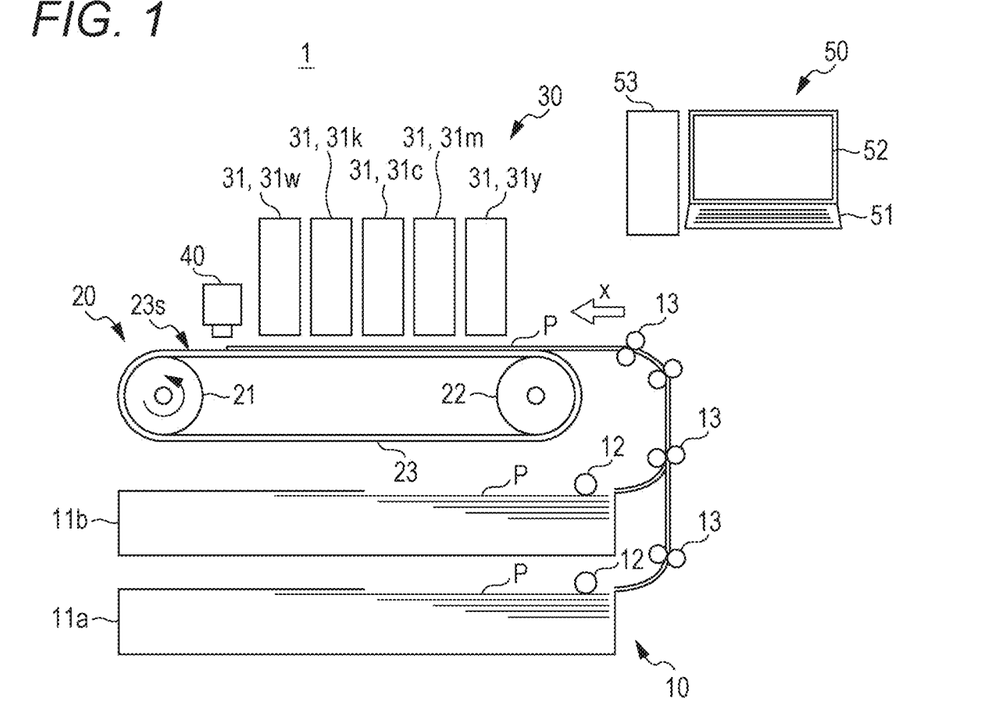
FIG. 1 illustrates the configuration of an image forming apparatus according to an embodiment.

FIG. 1 illustrates the configuration of an image forming apparatus 1 according to the embodiment, and is a side view of an image former in the inkjet image forming apparatus 1. As illustrated in the figure, the image forming apparatus 1 according to the embodiment includes a medium supplier 10, a medium conveyor 20, a coloring material supplier 30, an image reader 40, and a control device 50. These constituents have the following configurations.

<Medium Supplier 10>

The medium supplier 10 includes components such as a plurality of cassettes 11a and 11b (here, two as an example)

each for containing recording media P, a sending roller 12 for sending each recording medium P contained in the cassette 11a, a sending roller 12 for sending each recording medium P contained in the cassette 11b, and supply rollers 13 each for supplying the recording medium P sent by the corresponding sending roller 12 to the medium conveyor 20.

The recording medium P supplied by such a medium supplier 10 may be various in materials that enable ink landed on a sheet-shaped main face to be fixed thereon, such as a cloth and a sheet-shaped resin in addition to paper such as plain paper and coated paper. The medium supplier 10 may unwound a long recording medium P from a roll.

<Medium Conveyor 20>

The medium conveyor 20 conveys the recording medium P supplied from the medium supplier 10 in a predetermined direction. The medium conveyor 20 is, for example, a belt conveyor, and includes a drive roller 21, a driven roller 22, and an endless belt 23 stretched over the drive roller 21 and the driven roller 22. Rotation of the drive roller 21 causes the endless belt 23 to rotate around the drive roller 21 and the driven roller 22. An outer circumferential face portion between the drive roller 21 and the driven roller 22 of the endless belt 23 is a placement face 23s for the recording medium P. The endless belt 23 conveys, in a circumferential direction of the endless belt 23, the recording medium P supplied on the placement face 23s, with the recording medium P adsorbed on the placement face 23s.

Hereinafter, such a conveying direction of the recording medium P by the medium conveyor 20 is defined as the conveying direction x. In addition, within the placement face 23s of the endless belt 23, the direction perpendicular to the conveying direction x is defined as the width direction y.

<Coloring Material Supplier 30>

The coloring material supplier 30 is a device for supplying a coloring material to the recording medium P conveyed by the medium conveyor 20, and here, as an example, is an ink supplier. The coloring material supplier 30 includes a plurality of head units 31 disposed in the conveying direction x of the recording medium P. As an example, it is assumed that the image forming apparatus 1 in the present embodiment includes five head units 31y, 31m, 31c, 31k, and 31w one-to-one corresponding to four process colors in yellow (Y), magenta (M), cyan (C), and black (K); and white (W) color. These head units 31 are arranged at predetermined intervals in a predetermined order from upstream in the conveying direction x of the recording medium P.

Figure 2:
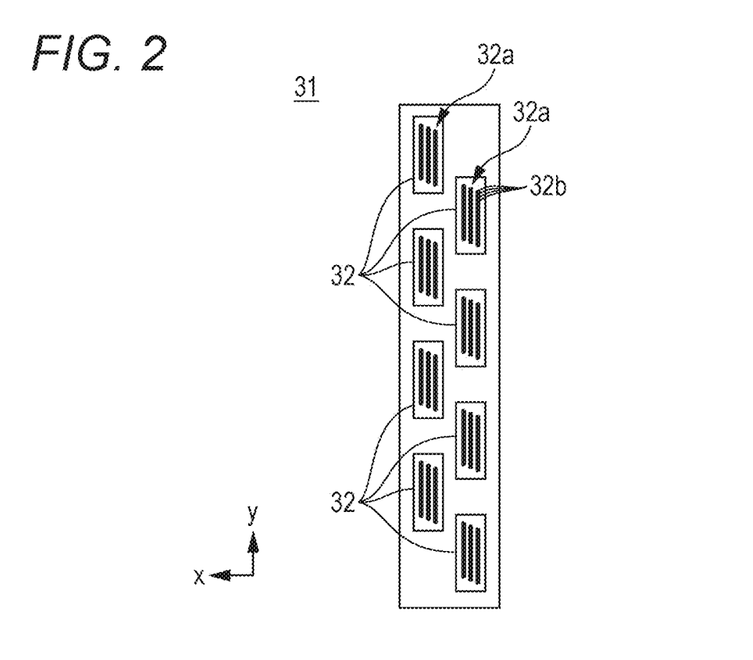
FIG. 2 is a bottom view of a head unit provided in the image forming apparatus according to the embodiment.

FIG. 2 is a bottom view of the head units 31 provided in the image forming apparatus 1 according to the embodiment, and one of the head units 31 illustrated in FIG. 1 is viewed from the face opposite to the medium conveyor 20.

As illustrated in FIG. 2, the head unit 31 includes a plurality of ink heads 32 arranged along the bottom face facing the medium conveyor 20. Here, as an example of the head unit 31, two rows each including four ink heads 32 are staggered in the width direction y perpendicular to the conveying direction x of the recording medium P. The face of each ink head 32 facing the medium conveyor 20 is a nozzle face 32a with which a plurality of nozzle openings 32b of the respective ink ejection nozzles is arranged.

Here, each ink head 32 has an ink chamber for storing ink, a head chip provided on the bottom face of the ink chamber, a drive circuit board, and the like. Of these constituents, the head chip may be of a piezo type using a piezoelectric actuator serving as a drive source for ejecting ink droplets, or of a thermal type. Such a head chip has a nozzle substrate on which a plurality of nozzles is formed in the thickness direction of the substrate material. The substrate face of the nozzle substrate is the above nozzle face 32a. The head chip includes an element substrate having an ink-pressure chamber or an ink-heating chamber that is in individual communication with the above ink chamber and each nozzle. Thus, ink ejection from each nozzle opening 32b is controlled individually.

Each head unit 31 having such a configuration as above has a size, for example, covering the width direction y of the recording medium P conveyed by the medium conveyor 20. The head unit 31 is of a one-pass type that enables ink to be simultaneously supplied to almost the face of the recording medium P. Note that the coloring material supplier 30 may be of a scanning type that allows the head unit 31 to perform reciprocally scanning in the width direction y.

<Image Reader 40>

The image reader 40 captures an image of the main face of the recording medium P conveyed by the medium conveyor 20. The image reader 40 is disposed downstream the coloring material supplier 30 in the conveying direction x of the medium conveyor 20, and reads an image of the recording medium P formed by ink supply from the coloring material supplier 30. Such an image reader 40 may be a line sensor with image capturing elements arranged, and each image capturing element may be a charge coupled device (CCD) or another element.

<Control Device 50>

The control device 50 performs various controls related to image formation performed with the image forming apparatus 1. Such a control device 50 includes, for example, an operator 51, a display 52, and a controller 53. These constituents have the following configurations.

[Operator 51]

The operator 51 is part for inputting various settings for image formation performed by the image forming apparatus 1. The operator 51 may be a touch panel integrally provided with the display 52 described next, or may be an operation panel provided separately from the display 52.

[Display 52]

The display 52 displays the details of operation on the operator 51. In addition, the display 52 displays a suitable color range as the base of an adjustment chart for image adjustment, in response to an instruction from the controller 53 described below. The display 52 further displays a notification regarding the cassette containing the recording medium P having a chromaticity within a suitable color range as the base of the adjustment chart for image adjustment, in response to an instruction from the controller 53 described below. These color ranges are values calculated by the controller 53 described next. Note that such operator 51 and display 52 may be those of a personal computer or another external device communicable for data exchange with the image forming apparatus 1 including the controller 53.

[Controller 53]

The controller 53 serves as a computing device. The computing device is hardware that is used as a so-called computer, and includes a central processing unit (CPU), a random access memory (RAM), and a non-volatile storage such as a read only memory (ROM) or a hard disk drive (HDD) that are not illustrated here. The computing device further includes a network interface.

Such a controller 53 stores various control programs in the non-volatile storage, and executes processing based on the stored programs. The various control programs held in the non-volatile storage include a control program in the image forming apparatus 1, which is characteristic in the present embodiment. Note that the controller 53 may be an information processing device provided in a personal computer or another external device communicable for data exchange with the image forming apparatus 1.

Figure 3:
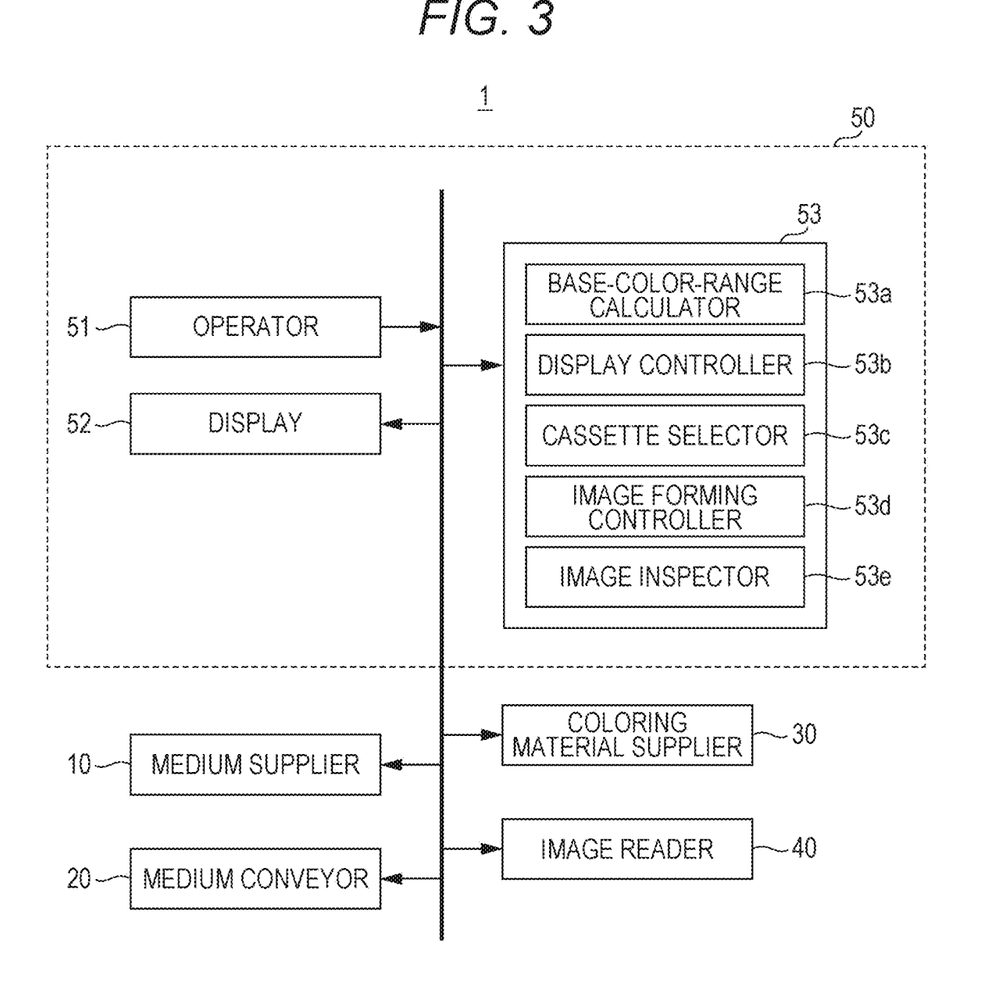
FIG. 3 is a block diagram illustrating the configuration of the image forming apparatus according to the embodiment.

FIG. 3 is a block diagram illustrating the configuration of the image forming apparatus according to the embodiment. As illustrated in the figure, the controller 53 includes, as functional elements, a base-color-range calculator 53a, a display controller 53b, a cassette selector 53c, an image forming controller 53d, and an image inspector 53e. Details of each of these functional elements are as follows.

—Base-Color-Range Calculator 53a—

The base-color-range calculator 53a calculates the base color range of an adjustment chart, based on the chromaticity of each color ink stored in the corresponding ink head 32. Here, the adjustment chart is an image having a test pattern for use in various image adjustments for image formation. The various image adjustments include adjustment of the formation position of each color ink, adjustment of color unevenness, and further include detection of an ejection failure of each color ink. Such an adjustment chart may be a normal image for use in accordance with the purpose of image adjustment.

In formation of such an adjustment chart, the base-color-range calculator 53a calculates a base color range common between the color inks supplied one-to-one from the head units 31. It is assumed that the base color range common between the color inks is a common large color range in color difference to the chromaticity of each color ink. In this case, the base-color-range calculator 53a sets a predetermined setting value to the color difference between each color ink, and calculates, as the base color range, a range having a color difference not less than the setting value to the chromaticity of each color ink.

Here, the color difference between the chromaticity of the base and the chromaticity of each color ink is preferably 20 or more, which enables sufficiently visual discrimination between the base and each color ink. Furthermore, if the color difference between the chromaticity of the base and the chromaticity of each color ink is 30 or more, various correction values can be automatically calculated with the image acquired by the image reader 40.

For such a base color range, the color difference between the chromaticity of each color ink stored in the corresponding head unit 31 and the chromaticity of the color sample of each color is calculated, and the color range of any color sample having a color difference not less than the setting value is calculated as the base color range.

Note that it is assumed that the chromaticity of each color ink stored in the corresponding head unit 31 is, for example, a value obtained by dropping, on a recording medium P having a reference color, each color ink with the same amount of droplets as the formation of the adjustment chart to form the corresponding chart, and then by color measuring each formed color patch. It is assumed that the reference color is white or transparent.

For the chromaticity of the color sample of each color, for example, can be used a value obtained by mechanically assigning the coordinate values of the L*a*b* color space chromaticity diagram at a predetermined interval (for example, 10 degrees) in each direction.

The base-color-range calculator 53a calculates the color difference between the chromaticity of each color ink and the chromaticity of the color sample of each color, and calculates, as the base color range, a color range having a color difference not less than a predetermined setting value (for example, color difference not less than 20 or not less than 30) to the respective chromaticities of all the color inks.

Note that the color difference is based on the color difference $\Delta E^{*}ab$ typically used for color difference determination in CIE LAB (L*a*b* color space), the chromatic exponential difference $\Delta^{*}b^{*}$, or the like. Here, it is preferable to use the color difference ($\Delta E_{00}$) in the CIE DE2000 color-difference formula defined so as to be close to the color discrimination area of the human eye on the color space of the CIE LAB (L*a*b* color space).

In addition, it is assumed that for the chromaticity of the color sample of each color, a value obtained by color measuring each color patch of the corresponding color formed on the recording medium having the reference color described above is used. As the respective color patches of the colors in this case, exemplified is a plurality of patches (for example, 10×10×10×10=10000 patches) formed by mechanically assigning the respective densities of color inks at predetermined intervals (for example, 10%). As another example of each color patch, the color patch of each color indicated in a reference color chart such as 1617 colors in IT8.7 is used. As still another example, the chromaticity of each color indicated in a color sample book such as Pantone or Munsell may be used as the chromaticity of the color sample. Alternatively, the chromaticity indicated in a sample book of paper (that is, recording media) published by a paper manufacturer may be used as the chromaticity of the color sample.

—Display Controller 53b—

Figure 4:
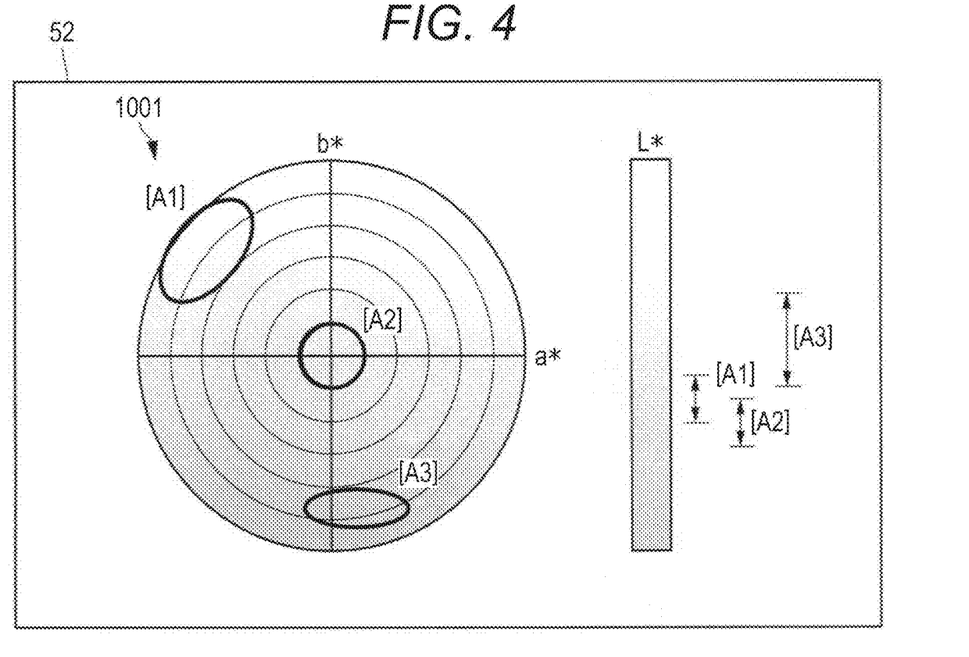
FIG. 4 is a display example (No. 1) of a base color range calculated in a control method in the image forming apparatus according to the embodiment.

The display controller 53b causes the display 52 to display the base color range calculated by the base-color-range calculator 53a. FIG. 4 is a display example (No. 1) of the base color range calculated in the control method in the image forming apparatus according to the embodiment. As illustrated in the figure, the display controller 53b may cause the display 52 to display the calculated base color ranges [A1] to [A3] on the chromaticity diagram 1001.

Figure 5:
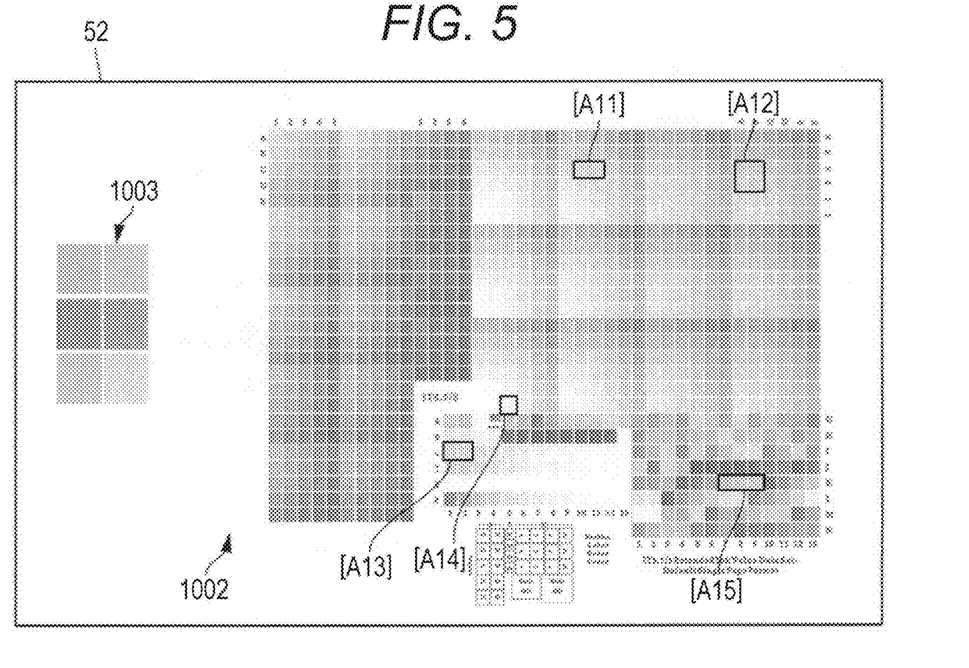
FIG. 5 is a display example (No. 2) of the base color range calculated in the control method in the image forming apparatus according to the embodiment.

FIG. 5 is a display example (No. 2) of the base color range calculated in the control method in the image forming apparatus according to the embodiment. As illustrated in the figure, for example, if a plurality of color patches is used, the display controller 53b may cause the display 52 to display the calculated base color ranges [A11] to [A15] on the color sample 1002 indicated with the patches. In addition, the patch 1003 within a calculated base color range may be extracted from the color sample 1002 for display.

In addition to the above, the display controller 53b may cause the display 52 to display an absolute value for the calculated base color range. In this case, the color range may be in Lab notation or Munsell notation.

Furthermore, the display controller 53b may cause the display 52 to display the calculated base color range as the type (brand or paper type) of a recording medium having a chromaticity included in the color range. Still furthermore, the display controller 53b may cause the display 52 to display whether or not the recording medium having the chromaticity included in the calculated base color range is contained in either the cassette 11a or the cassette 11b. In this case, the display controller 53b causes the display 52 to perform this display, based on chromaticity information for each type (brand or paper type) of the corresponding recording medium held in advance.

—Cassette Selector 53c—

The cassette selector 53c determines whether or not a recording medium P having a chromaticity within the base color range calculated by the base-color-range calculator 53a is contained in either the cassette 11a or the cassette 11b of the medium supplier 10. This determination is performed, for example, based on medium information held in the cassette selector 53c. It is assumed that this medium information is, for example, information input from the operator 51 of the control device 50.

—Image Forming Controller 53d—

The image forming controller 53d controls the drive of the medium supplier 10, the drive of the medium conveyor 20, and the drive of the coloring material supplier 30 to form the adjustment chart on the recording medium P. In this formation, the image forming controller 53d forms the adjustment chart, based on the base color range calculated by the base-color-range calculator 53a and the determination by the cassette selector 53c.

The adjustment chart formed by the control of the image forming controller 53d is an adjustment chart formed directly on the recording medium P, or a coloring-material-base-attached adjustment chart. An adjustment chart formed directly on the recording medium P is formed on the recording medium P having the chromaticity within the base color range. In addition, a coloring-material-base-attached adjustment chart is formed on a coloring material base having the chromaticity within the base color range. The procedures of forming an adjustment chart by such an image forming controller 53d will be described in detail in the subsequent control method in the image forming apparatus.

—Image inspector 53e—

The image inspector 53e controls the drive of the image reader 40 to perform reading the adjustment chart formed on the recording medium P. In addition, the image inspector 53e may analyze the adjustment chart read from the recording medium P for calculating a correction value based on the analysis result. Here, the correction value is, for example, an ink ejection timing from the nozzle openings 32b of the ink head 32, the position of the head unit 31 including the ink heads 32, the amount of ink ejection, and the like.

«Control Method in Image Forming Apparatus»

Figure 6:
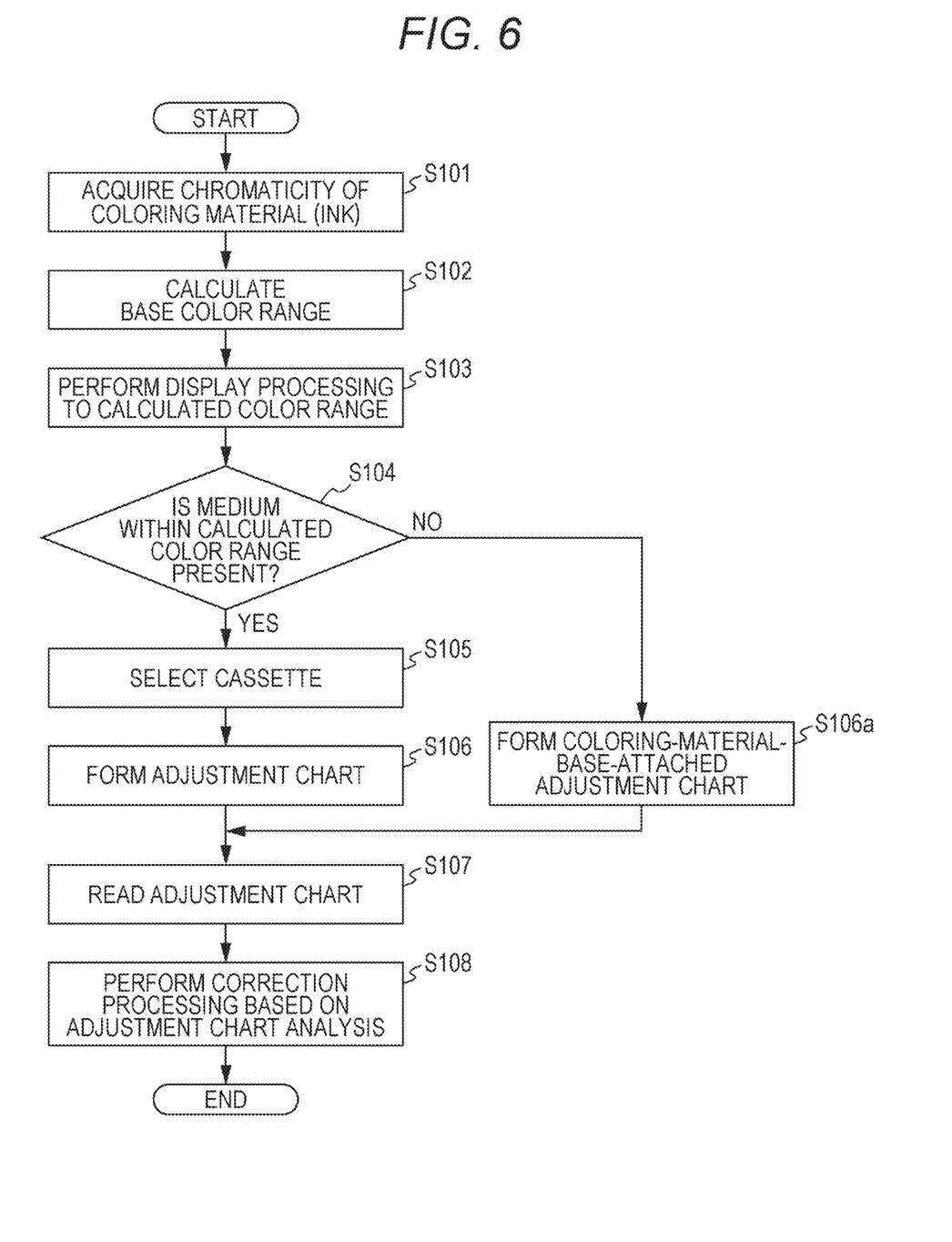
FIG. 6 is a flowchart illustrating the control method in the image forming apparatus according to the embodiment.

FIG. 6 is a flowchart illustrating the control method in the image forming apparatus according to the embodiment, and illustrates the procedures of image adjustment executed by the control program held in the controller 53 described with reference to FIGS. 1 to 5. Hereinafter, the control method in the image forming apparatus 1 will be described with reference to FIGS. 1 to 5 above and other figures as needed along the flowchart of FIG. 6. Note that input of an instruction of forming an adjustment chart in the operator 51 of the control device 50 triggers start of this flow, for example.

[Step S101]

In step S101, the base-color-range calculator 53a acquires the chromaticity of each color ink (coloring material) stored in the corresponding ink head 32. The color inks are, for example, five color inks including four process colors in yellow (Y), magenta (M), cyan (C), and black (K); and white (W) color. The chromaticity of each color ink may be information obtained by color measuring the image of each color ink formed in the corresponding single color on the recording medium P having the reference color of white or transparent, and may be, for example, information input from the operator 51 of the control device 50 or may be information obtained from a colorimeter that is not illustrated here.

[Step S102]

In step S102, the base-color-range calculator 53a calculates a base color range for forming an adjustment chart with each color ink, based on the acquired chromaticity of each color ink, as described above.

[Step S103]

In step S103, the display controller 53b causes the display 52 to display the base color range calculated by the base-color-range calculator 53a (see FIGS. 4 and 5).

As a result, the user of the image forming apparatus 1 can confirm the color range suitable for the base of the adjustment chart formed with each color ink, from the display image on the display 52. Then, the user of the image forming apparatus 1 can put a recording medium P having a chromaticity within the calculated color range into either the cassette 11a or the cassette 11b of the medium supplier 10. In addition, the user of the image forming apparatus 1 can input, from the operator 51 of the control device 50, information regarding that which of the cassettes 11a and 11b contains the recording medium P having the chromaticity within the color range.

[Step S104]

In step S104, the cassette selector 53c determines whether or not the recording medium P having the chromaticity within the base color range calculated by the base-color-range calculator 53a is contained in either the cassette 11a or the cassette 11b of the medium supplier 10. In a case where the cassette selector 53c determines that the recording medium P having the chromaticity within the base color range is contained in either the cassette 11a or the cassette 11b of the medium supplier 10 (YES), the flow proceeds to step S105. On the other hand, in a case where it is determined that no recording medium P having the chromaticity within the base color range is contained in either the cassette 11a or the cassette 11b of the medium supplier 10 (NO), the flow proceeds to step S106a.

[Step S105]

In step S105, the cassette selector 53c selects the cassette containing the recording medium P having the chromaticity within the base color range from the plurality of cassettes 11a and 11b included in the medium supplier 10, and then the flow proceeds to step S106. Note that the display controller 53b may cause the display 52 to display which of the plurality of cassettes 11a and 11b contains the recording medium P having the chromaticity within the base color range calculated by the base-color-range calculator 53a. As a result, the user of the image forming apparatus 1 may perform an operation from the operator 51 to select either the cassette 11a or cassette 11b such that the recording medium P is supplied.

[Step S106]

In step S106, the image forming controller 53d forms an adjustment chart on the recording medium P. In this formation, the image forming controller 53d controls the drive of the medium supplier 10, so that the medium supplier 10 supplies the recording medium P having the chromaticity within the base color range from the cassette selected by the cassette selector 53c. The image forming controller 53d also controls the drive of the medium conveyor 20 and the drive of the coloring material supplier 30, and forms the adjustment chart on the recording medium P. The adjustment chart formed here may be an adjustment chart set in the operator 51 of the control device 50, or may be of a plurality of types.

Figure 7:
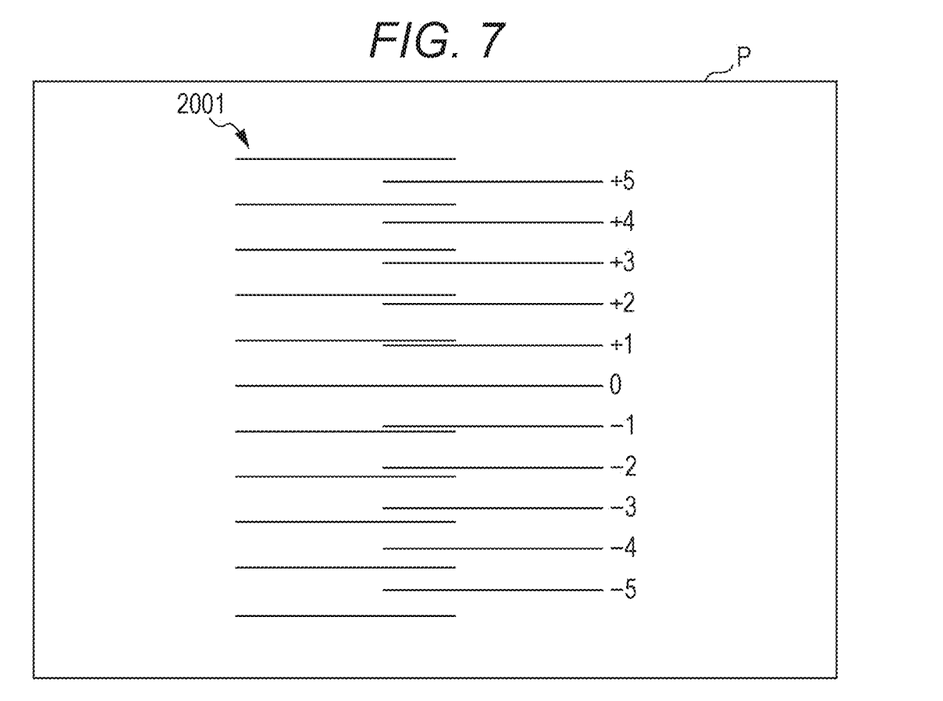
FIG. 7 illustrates an exemplary adjustment chart formed in the control method in the image forming apparatus according to the embodiment.

FIG. 7 illustrates an exemplary adjustment chart 2001 formed in the control method in the image forming apparatus according to the embodiment, and is an exemplary adjustment chart for aligning the formation position of each color ink. The adjustment chart 2001 illustrated in this figure includes the pattern of each color ink formed by landing each color ink in the corresponding single color directly on the recording medium P. This recording medium P has a color difference not less than a setting value (for example, not less than 20 or not less than 30) to the respective chromaticities of all the plurality of color inks included in the adjustment chart 2001. Thus, the adjustment chart 2001 formed on the recording medium P enables easy detection of all the color inks.

Note that as a comparison, for example, in a case where a base having a color difference not less than a predetermined value to the chromaticity of the white ink is provided only as a white ink base, an end portion of the color ink adjacent to the white ink is disposed overlapping on the white ink base. In this case, the color difference between the adjacent color ink and the base is insufficient, and thus it may be difficult to detect the formation position of the adjacent color ink to the white ink.

[Step S106a]

On the other hand, in step S106a, the image forming controller 53d forms a coloring-material-base-attached adjustment chart on the recording medium P. In this formation, the image forming controller 53d controls the drive of the medium supplier 10, so that the medium supplier 10 supplies the recording medium P from either the cassette 11a or the cassette 11b. The image forming controller 53d also controls the drive of the medium conveyor 20 and the drive of the coloring material supplier 30, and forms a coloring material base (here, an ink base) on the recording medium P and forms an adjustment chart. Similarly to step S106, the adjustment chart formed here may be an adjustment chart set in the operator 51 of the control device 50, or may be of a plurality of types.

Figure 8:
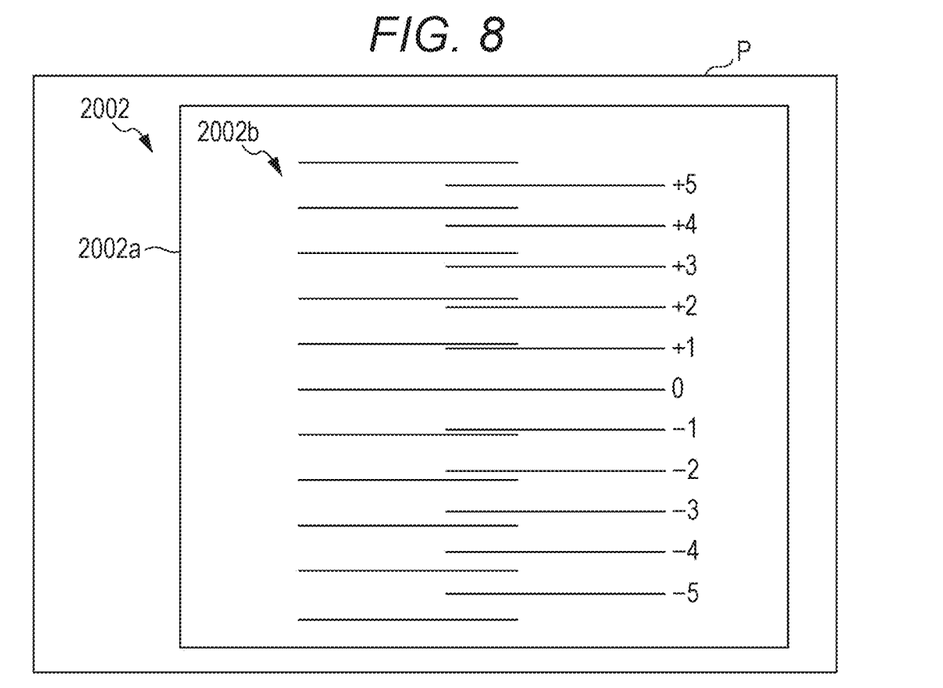
FIG. 8 illustrates an exemplary coloring-material-base-attached adjustment chart formed in the control method in the image forming apparatus according to the embodiment.

FIG. 8 illustrates an exemplary coloring-material-base-attached adjustment chart 2002 formed in the control method in the image forming apparatus according to the embodiment, and is an exemplary adjustment chart for aligning the formation position of each color ink. As illustrated in the figure, the coloring-material-base-attached adjustment chart 2002 includes a coloring material base 2002a formed on the recording medium P, and an adjustment chart 2002b formed on the coloring material base 2002a. The coloring material base 2002a has a color difference not less than a setting value (for example, not less than 20 or not less than 30) to the respective chromaticities of all the plurality of color inks included in the adjustment chart 2002b. Thus, the adjustment chart 2002b formed on the coloring material base 2002a enables detection of all the color inks.

[Step S107]

In step S107, the image inspector 53e controls the drive of the image reader 40 to perform reading the adjustment chart formed on the recording medium P.

[Step S108]

In step S108, the image inspector 53e analyzes the adjustment chart read from the recording medium P, and calculates a correction value related to image formation, based on the analysis result. This correction value is, for example, an ink ejection timing from the nozzle openings 32b of the ink head 32 and the position of the head unit 31 including the ink heads 32. In addition, in a case where a color-unevenness adjustment chart is formed as an adjustment chart, such a correction value is the amount of ink ejected from each nozzle opening 32b.

In addition, the image inspector 53e may feed back the calculated correction value to the image forming controller 53d as needed. Thus, the image forming controller 53d can correct the ink ejection timing from the nozzle openings 32b, correct the position of the head unit 31 including the ink heads 32, and further correct the amount of ink ejected from each nozzle opening 32b. The image inspector 53e may also feed back the calculated correction value to the display controller 53b as needed. Thus, the display controller 53b can cause the display 52 to display the correction value for notifying the user of the image forming apparatus 1 of the correction value, which enables correction processing handled by the user to be performed.

A series of procedures of the control method as above ends. Note that step S108 may be performed as needed, and thus is not necessarily performed in a case where the adjustment chart formed on the recording medium P is visually inspected.

Effects of Embodiment

As described above, according to the present embodiment, an adjustment chart is formed with each color ink on the base with a color range having a color difference not less than a setting value to the respective chromaticities of all the color inks, which enables simultaneous and easy detection of all the color inks on the adjustment chart. As a result, high-precision image adjustment with a plurality of color inks can be performed with a small number of procedures. In particular, the adjustment charts for aligning the formation position of each color ink described with reference to FIGS. 7 and 8 enable simultaneous comparison between all the color inks including the white color, resulting in exhibiting a remarkable effect. Furthermore, adjustment of color unevenness and detection of an ejection failure of each color ink are adjustable for each color of the corresponding color ink. However, even in such a case, applying the present embodiment eliminates efforts such as specially changing the base to a colored base only for adjustment of the white ink, and an adjustment chart with all the color inks formed on the same base enables adjusting color evenness and detecting an ejection failure of each color ink.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus that forms an image with a plurality of coloring materials on a recording medium, the image forming apparatus comprising:
a hardware processor that calculates a chromaticity range having a color difference not less than a setting value to respective chromaticities of the plurality of coloring materials for use in formation of the image, as a base color range common between the plurality of coloring materials, and forms an adjustment chart on a base having a chromaticity included in the base color range calculated by the hardware processor.

2. The image forming apparatus according to claim 1, wherein one of the plurality of coloring materials is a white color material.

3. The image forming apparatus according to claim 1, wherein the hardware processor calculates, as the base color range, the chromaticity range having a color difference of 20 or more to the respective chromaticities of the plurality of coloring materials.

4. The image forming apparatus according to claim 1, wherein the hardware processor calculates, as the base color range, the chromaticity range having a color difference of 30 or more to the respective chromaticities of the plurality of coloring materials.

5. The image forming apparatus according to claim 1, wherein the hardware processor calculates the chromaticity range, based on a CIE DE2000 color-difference formula.

6. The image forming apparatus according to claim 1, further comprising:
a display that displays the base color range calculated by the hardware processor.

7. The image forming apparatus according to claim 1, wherein
the hardware processor forms, with the plurality of coloring materials, the base having a chromaticity included in the base color range calculated by the hardware processor, on the recording medium.

8. The image forming apparatus according to claim 1, further comprising:
a coloring material supplier that supplies the plurality of coloring materials to form the image on the recording medium; and
a medium supplier that supplies, to the coloring material supplier, the recording medium having a chromaticity included in the base color range calculated by the hardware processor.

9. The image forming apparatus according to claim 8, wherein the medium supplier includes a plurality of cassettes for containing the recording medium; and
a display that displays which of the plurality of cassettes contains the recording medium having the chromaticity included in the base color range calculated by the hardware processor.

10. A control method by a hardware processor in an image forming apparatus that forms an image with a plurality of coloring materials on a recording medium, the control method comprising:
calculating a chromaticity range having a color difference not less than a setting value to respective chromaticities of the plurality of coloring materials for use in formation of the image, as a base color range common between the plurality of coloring materials, and
forming an adjustment chart on a base having a chromaticity included in the base color range.

11. A non-transitory recording medium storing a computer readable control program for causing a hardware processor in an image forming apparatus that forms an image with a plurality of coloring materials on a recording medium, to perform:
calculating a chromaticity range having a color difference not less than a setting value to respective chromaticities of the plurality of coloring materials for use in formation of the image, as a base color range common between the plurality of coloring materials, and
forming an adjustment chart on a base having a chromaticity included in the base color range.

* * * * *